United States Patent
Park et al.

(10) Patent No.: US 8,929,958 B2
(45) Date of Patent: Jan. 6, 2015

(54) MOBILE TERMINAL AND METHOD OF TRANSMITTING AND RECEIVING SIGNAL THEREOF

(75) Inventors: Min-kyoung Park, Gwangju-si (KR); Ho Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1419 days.

(21) Appl. No.: 12/081,884

(22) Filed: Apr. 23, 2008

(65) Prior Publication Data

US 2009/0124300 A1    May 14, 2009

(30) Foreign Application Priority Data

Nov. 8, 2007    (KR) .................. 10-2007-0113962

(51) Int. Cl.
| | | |
|---|---|---|
| *H04B 1/38* | (2006.01) | |
| *H04B 7/04* | (2006.01) | |
| *H04L 1/00* | (2006.01) | |

(52) U.S. Cl.
CPC ............ *H04B 7/0413* (2013.01); *H04L 1/0003* (2013.01); *H04L 1/0016* (2013.01); *H04L 1/0026* (2013.01); *H04L 1/0009* (2013.01); *H04L 1/0017* (2013.01)
USPC ............................ 455/574; 455/353; 370/311

(58) Field of Classification Search
USPC ........ 455/450–452.2, 574, 93, 142, 352, 353; 370/311, 329, 437
See application file for complete search history.

(56) References Cited

U.S. PATENT DOCUMENTS

| | | | | |
|---|---|---|---|---|
| 6,922,445 B1* | 7/2005 | Sampath et al. | .............. | 375/267 |
| 7,047,016 B2* | 5/2006 | Walton et al. | .............. | 455/452.1 |
| 7,525,988 B2* | 4/2009 | Kim | .............................. | 370/465 |
| 2004/0203992 A1 | 10/2004 | Yun | | |
| 2005/0113151 A1 | 5/2005 | Burke et al. | | |
| 2005/0281221 A1 | 12/2005 | Roh et al. | | |
| 2007/0070960 A1 | 3/2007 | Barak et al. | | |

FOREIGN PATENT DOCUMENTS

| | | |
|---|---|---|
| JP | 2005-039728 | 2/2005 |
| JP | 2006-217178 | 8/2006 |
| JP | 2006-246172 | 9/2006 |
| KR | 10-2003-0084154 A | 11/2003 |
| KR | 10-2005-0120520 A | 12/2005 |
| KR | 1020070061743 | 6/2007 |
| WO | WO 2005/084379 | 9/2005 |

OTHER PUBLICATIONS

Korean Office Action issued on Jul. 23, 2013 in counterpart Korean Application 10-2007-0113962. (4 Pages with complete English Translation).

* cited by examiner

*Primary Examiner* — Christian Hannon
(74) *Attorney, Agent, or Firm* — NSIP Law

(57) ABSTRACT

Provided are a mobile terminal and a method of transmitting and receiving signals in the mobile terminal. The method selects a modulation method and an antenna mode for optimizing energy consumption when signals are transmitted and received in consideration of a network operation mode, a channel environment, Quality of Service (QoS), and the like, and transmits and receives signals using the modulation method and antenna mode.

18 Claims, 6 Drawing Sheets

FIG.4

| Channel Class | SISO SNR $\gamma$[dB] | Data Rate constraint*, $R_t$[M bps] | | | |
|---|---|---|---|---|---|
| | | $0<R_t<10$ | $10 \leq R_t<25$ | $25 \leq R_t<40$ | $R_t \geq 40$ |
| LOS | $13 \leq \gamma<16$ | $2,e_2$ | X | X | X |
| | $16 \leq \gamma<22$ | $4,e_4$ | $4,e_4$ | X | X |
| | $22 \leq \gamma<27$ | $16,e_{16}$ | $16,e_{16}$ | $16,e_{16}$ | X |
| | $\gamma \geq 27$ | $64,e_{64}$ | $64,e_{64}$ | $64,e_{64}$ | $64,e_{64}$ |
| NLOS | $18 \leq \gamma<21$ | $2,e_2$ | X | X | X |
| | $21 \leq \gamma<27$ | $4,e_4$ | $4,e_4$ | X | X |
| | $27 \leq \gamma<32$ | $16,e_{16}$ | $16,e_{16}$ | $16,e_{16}$ | X |
| | $\gamma \geq 32$ | $64,e_{64}$ | $64,e_{64}$ | $64,e_{64}$ | $64,e_{64}$ |

MOBILE TERMINAL AND METHOD OF TRANSMITTING AND RECEIVING SIGNAL THEREOF

CROSS REFERENCE TO RELATED APPLICATIONS

This application claims the benefit under 35 U.S.C. §119 (a) of Korean Patent Application No. 10-2007-0113962, filed Nov. 8, 2007, in the Korean Intellectual Property Office, the disclosure of which is incorporated by reference.

BACKGROUND OF THE INVENTION

1. Field of the Invention

The present invention relates to a method of transmitting and receiving signals in a mobile terminal. More particularly, the present invention relates to a mobile terminal that can optimize energy used for signal transmission and reception, and a method of transmitting and receiving signals in the mobile terminal.

2. Description of the Related Art

Recently, mobile terminals comprising a plurality of antennas are being developed. For the development of such a mobile terminal, research is being conducted on a Multiple Input Multiple Output (MIMO) technology for processing data at a high speed in a multimedia environment.

A mobile terminal comprising a plurality of antennas is driven by the voltage of a battery and communicates with another party. However, such a mobile terminal uses more energy when transmitting or receiving signals than a mobile terminal comprising only a single antenna.

In order to reduce energy consumption of the mobile terminal, a variety of methods have been proposed, including reducing energy consumption only when a mobile terminal transmits signals.

The conventional method reduces energy consumption of a mobile terminal comprising a plurality of antennas only with regard to predetermined factors among a network operation mode, a channel environment, quality of service (QoS), and the like.

Therefore, the conventional technique cannot optimize energy used for communications between a mobile terminal and another party, because it cannot consider all factors of a network operation mode, a channel environment, QoS, and the like.

SUMMARY OF THE INVENTION

Exemplary embodiments of the present invention address at least the above problems and/or disadvantages and provide at least the advantages described below. Accordingly, an aspect of an exemplary embodiment of the present invention is to provide a mobile terminal which can optimize energy consumption when transmitting and receiving signals, in consideration of a network operation mode, a channel environment, quality of service (QoS), and the like, and a method of transmitting and receiving signals in the mobile terminal.

Exemplary embodiments of the present invention disclose a mobile terminal that selects a modulation method and antenna mode for optimizing energy consumption when signals are transmitted or received, in consideration of a network operation mode, a channel environment, quality of service (QoS), and the like, and a method of transmitting and receiving signals in the mobile terminal according to the modulation method and antenna mode.

According to an aspect of exemplary embodiments of the present invention, there is provided a mobile terminal comprising an information extractor for extracting channel information using a message received from another party's terminal; and a mode selection unit for selecting a modulation method and an antenna mode for optimizing energy consumption using the channel information and Quality of Service (QoS) information.

Exemplary embodiments of the present invention provide that the mode selection unit selects a lookup table group for optimizing energy consumption required for communications between the other party's terminal and the mobile terminal according to a network operation mode of the mobile terminal, from among a plurality of lookup table groups that have been prepared in advance, to optimize energy consumption according to network operation modes.

Exemplary embodiments of the present invention provide that the mode selection unit further comprising a first lookup table group corresponding to a first network operation mode for optimizing a total of energy consumption when signals are transmitted and received; a second lookup table group corresponding to a second network operation mode for optimizing energy consumption when signals are received; and a third lookup table group corresponding to a third network operation mode for optimizing energy consumption when signals are transmitted.

Exemplary embodiments of the present invention further provide that the lookup table group comprising a plurality of lookup tables that store information about modulation methods in which minimum energy is used, and information about values of energy used when the modulation methods are used according to antenna modes.

Exemplary embodiments of the present invention further provide that the mode selection unit selects a lookup table group corresponding to the network operation mode from among the plurality of lookup table groups and selects a modulation method and an antenna mode in which minimum energy consumption is obtained using the channel information and the QoS information from the selected lookup table group.

Exemplary embodiments of the present invention further provide that a mobile terminal comprising a mode selection unit for selecting a modulation method and an antenna mode for optimizing energy consumption required for communications between the mobile terminal and the other party's terminal using a message which is received wirelessly from the other party's terminal; and coding data according the modulation method and transmitting the coded data wirelessly to the other party's terminal according to the antenna mode.

Exemplary embodiments of the present invention further provide that when the mobile terminal is in a second network operation mode, the mode selection unit selects a modulation method and an antenna mode for optimizing energy consumption using channel information and QoS information extracted using the message which is received wirelessly from the other party's terminal.

According to another aspect of exemplary embodiments of the present invention, there is provided a method of receiving and transmitting a signal in a mobile terminal, the method comprising the steps of selecting a modulation method and an antenna mode for optimizing energy consumption required for communications between the mobile terminal and the other party's terminal using a message which is received wirelessly from the other party's terminal; and transmitting data according to the modulation method and transmitting the coded data wirelessly to the other party's terminal according to the antenna mode.

BRIEF DESCRIPTION OF THE DRAWINGS

The above and other aspects, features, and advantages of certain embodiments of the present invention will be more apparent from the following description taken in conjunction with the accompanying drawings, in which:

FIG. 4 shows an example of a lookup table which is used to optimize energy consumption, according to an exemplary embodiment of the present invention;

Throughout the drawings, the same drawing reference numerals will be understood to refer to the same elements, features, and structures. In the drawings, the size and relative sizes of layers and regions may be exaggerated for clarity.

DETAILED DESCRIPTION OF EXEMPLARY EMBODIMENTS

Figure 1:
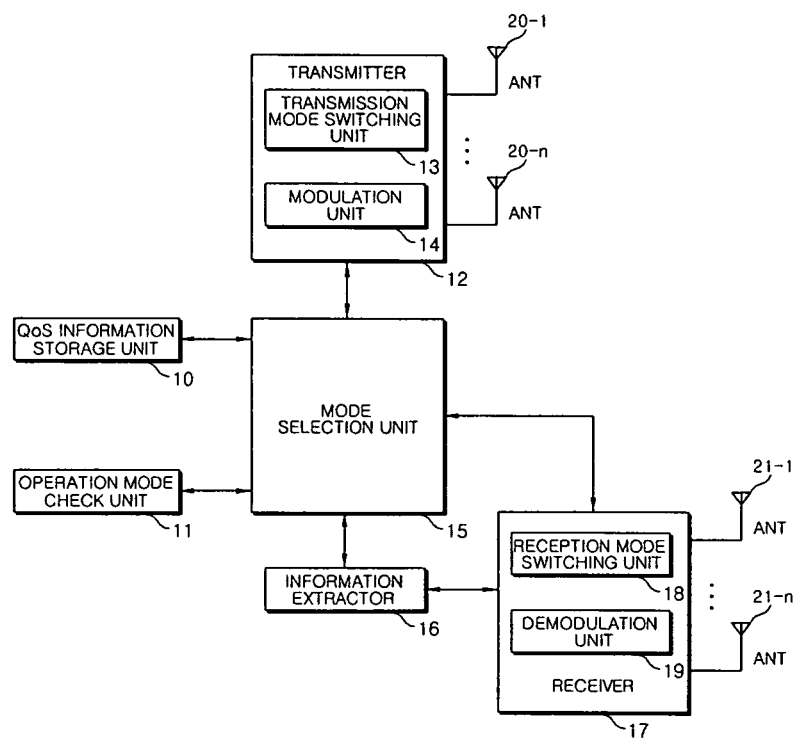
FIG. 1 is a block diagram of a mobile terminal according to an exemplary embodiment of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. The invention is described more fully hereinafter with reference to the accompanying drawings, in which exemplary embodiments of the invention are shown. Like reference numerals in the drawings denote like elements.

FIG. 1 is a block diagram of a mobile terminal according to an exemplary embodiment of the present invention.

Referring to FIG. 1, the mobile terminal includes a transmitter 12, a mode selection unit 15, an information extractor 16, and a receiver 17.

The mobile terminal can select a modulation method and antenna mode for optimizing energy consumption according to a request of another party's terminal. The mobile terminal can also request the other party's terminal select a modulation method and antenna mode for optimizing energy consumption, and change an existing modulation method and antenna mode according to information about the modulation method and antenna mode that is selected by and received from the other party's terminal.

First, in the case of selecting a modulation method and antenna mode according to a request of the other party's terminal, the information extractor 16 extracts channel information using a message which is received wirelessly from the other party's terminal.

Then, the mode selection unit 15 selects a lookup table group corresponding to a network operation mode of the other party's terminal from among a plurality of lookup table groups, which have been prepared in advance to optimize energy consumption according to network operation modes, extracts channel information and quality of service (QoS) information from the selected lookup table group, and selects a modulation method and antenna mode for optimizing energy consumption for signal transmission and reception using the channel information and QoS information.

The network operation modes include a first network operation mode (hereinafter, referred to as an "ad hoc mode"), a second network operation mode (hereinafter, referred to as an "infrastructure reception mode") and a third network operation mode (hereinafter, referred to as an "infrastructure transmission mode").

Meanwhile, in the case of requesting the other party's terminal to select a modulation method and antenna mode for optimizing energy consumption, the mode selection unit 15 can request the other party's terminal select a modulation method and antenna mode. The mode selection unit 15 then selects a modulation method and antenna mode for optimizing energy consumption required for communications with the other party's terminal, which uses a message is received from the other party's terminal, or simply selects a modulation method and antenna mode, which is included in a message is received from the other party's terminal.

At this point, selection of the modulation method and antenna mode, which uses the message received wirelessly from the other party's terminal, may be applied when the mobile terminal operates in the infrastructure reception mode. On the other hand, selection of the modulation method and antenna mode, which is included in the message received wirelessly from the other party's terminal, may be applied when the mobile terminal operates in the ad hoc mode.

The transmitter 12 codes data according to the modulation method selected by the mode selection unit 15, and transmits the coded data wirelessly to the other party's terminal through at least one transmitting antenna among a plurality of transmitting antennas 20-1, . . . , 20-n, according to the antenna mode selected by the mode selection unit 15.

The transmitter 12, the mode selection unit 15, the information extractor 16, and the receiver 17 will now be described in more detail.

The mobile terminal according to an exemplary embodiment of the present invention further includes a QoS information storage unit 10 and an operation mode check unit 11.

The QoS information storage unit 10 stores QoS information that is set in advance by a user. The QoS information may be information about a bit error rate (BER) and a data transfer rate.

The operation mode check unit 11 checks network operation mode information included in a Medium Access Control (MAC) management message, which is transmitted and received between the mobile terminal and the other party's terminal, and thus recognizes a network operation mode of the mobile terminal. Here, the network operation mode of the mobile terminal may be the ad hoc mode or the infrastructure mode, wherein the infrastructure mode may be classified into the infrastructure transmission mode and the infrastructure reception mode.

First, the case where the mobile terminal selects a modulation method and antenna mode for optimizing energy consumption according to a request of the other party's terminal will now be described.

If a message received from the other party's terminal includes mode selection request information, the receiver 17 transmits the mode selection request information to the mode selection unit 15, and the message to the information extractor 16.

The information extractor 16 extracts information about a current channel between the mobile terminal and the other party's terminal, using the message. The current channel information may be Line Of Sight (LOS)/Non Line Of Sight (NLOS) information indicating whether any obstacle exists in a channel environment between the mobile terminal and the other party's terminal, as well as information about the signal strength of the message.

The mode selection unit 15 includes a plurality of lookup table groups that have been prepared in advance to optimize energy consumption according to a network operation mode of the mobile terminal, and selects a lookup table group corresponding to the network operation mode of the mobile terminal from among the plurality of lookup table groups.

The plurality of lookup table groups include a lookup table group corresponding to the ad hoc mode for optimizing total energy consumption when the mobile terminal receives and transmits signals, a lookup table group corresponding to an infrastructure transmission mode for optimizing energy consumption when the mobile terminal transmits signals, and a lookup table group corresponding to an infrastructure reception mode for optimizing energy consumption when the mobile terminal receives signals.

Also, each lookup table group may include a plurality of lookup tables that store information about modulation methods that are suitable for respective antenna modes and about energy used when each modulation method is used.

The antenna modes may include a Single Input Single Output (SISO) mode, a Single Input Multiple Output (SIMO) mode, a Multiple Input Single Output (MISO) mode, and a Multiple Input Multiple Output (MIMO) mode. In this disclosure, the term "modulation method" contains the meanings of both "modulation" and "channel coding".

In response to the mode selection request information, the mode selection unit 15 selects a modulation method and antenna mode in which minimum energy consumption can be obtained from the selected lookup table group using the channel information and QoS information. Then, the mode selection unit 15 transfers the selected modulation method and antenna mode to the transmitter 12. The transmitter 12 may include a transmission mode switching unit 13 and a modulation unit 14.

The transmission mode switching unit 13 changes an existing modulation method and antenna mode to the selected modulation method and antenna mode.

If there is data to be transmitted to the other party's terminal after the modulation method and the antenna mode are selected, the modulation unit 14 codes the data that is to be transmitted according to the selected modulation method and transmits the coded data wirelessly to the other party's terminal through at least one transmitting antenna among the plurality of transmitting antennas 20-1, . . . , **20-*n***, according to the selected antenna mode.

The receiver 17 may include a reception mode switching unit 18 and a demodulation unit 19.

The reception mode switching unit 18 also changes the existing modulation method and antenna mode to the selected modulation method and antenna mode. The demodulation unit 19 demodulates, according to the selected modulation method, a signal that is received from the other party's terminal through at least one receiving antenna among a plurality of receiving antennas 21-1, . . . , **21-*n***, according to the selected antenna mode.

Meanwhile, the case wherein the mobile terminal requests the other party's terminal to select a modulation method and antenna mode for optimizing energy consumption, and changes an existing modulation method and antenna mode according to information about the modulation method and antenna mode selected by and received from the other party's terminal will now be described.

When the mobile terminal transmits burst data having a size larger than a defined data size, the mode selection unit 15 checks a network operation mode of the mobile terminal through the operation mode check unit 11.

The mode selection unit 15 changes an existing modulation method and antenna mode to a modulation method and antenna mode that is suitable for the network operation mode of the mobile terminal.

First, if the network operation mode is the ad hoc mode, the mode selection unit 15 adds the burst data and the mode selection request information to a first transmission message and transmits the resultant first transmission message to the transmitter 12. The transmitter 12 codes the first transmission message and transmits the coded first transmission message wirelessly to the other party's terminal through at least one transmitting antenna among the plurality of transmitting antennas 20-1, . . . , **20-*n***.

The receiver 17 transmits to the mode selection unit 15 information about a modulation method and antenna mode included in a first response message, which is received from the other party's terminal, in response to the first transmission message. At this point, the information about the modulation method and antenna mode is information about a modulation method and antenna mode that is required to optimize energy consumed when the mobile terminal transmits and receives signals.

The mode selection unit 15 transmits the information about the modulation method and antenna mode included in the first response message to the transmitter 12 and the receiver 17. Accordingly, the transmission mode switching unit 13 changes the existing modulation method and antenna mode to the modulation method and antenna mode included in the first response message, and the receiver 17 also changes the existing modulation method and antenna mode to the modulation method and antenna mode included in the first response message.

Accordingly, data that is to be transmitted to the other party's terminal is coded according to the changed modulation method and antenna method, and then transmitted wirelessly to the other party's terminal through at least one transmitting antenna among the plurality of transmitting antennas 20-1, . . . , **20-*n***.

Then, data received from the other party's terminal through at least one receiving antenna among the plurality of receiving antennas 21-1, . . . , **21-*n*** is demodulated according to the changed modulation method.

Meanwhile, if the receiver 17 receives a first acknowledge message for the data, which is coded and transmitted to the other party's terminal according to the changed modulation method and antenna mode, the receiver 17 determines whether information about a newly changed modulation method and antenna mode exists in the first acknowledge message.

If information about a newly changed modulation method and antenna mode exists in the first acknowledge message, the receiver 17 determines whether data that is to be transmitted to the other party's terminal remains in the transmitter 12 through the mode selection unit 15.

If data that is to be transmitted to the other party's terminal remains, the receiver 17 transfers to the mode selection unit 15 the information about the newly changed modulation method and antenna mode included in the first acknowledge message, and changes the changed modulation method and antenna mode to the newly changed modulation method and antenna mode.

The mode selection unit 15 transfers the information about the newly changed modulation method and antenna mode to the transmitter 12. Thus, the transmission mode switching unit 13 changes the changed modulation method and antenna mode to the newly changed modulation method and antenna mode.

Thereafter, the data that is to be transmitted to the other party's terminal is coded according to the newly changed modulation method, and then transmitted to the other party's terminal through at least one transmission antenna among the plurality of transmitting antennas 20-1, ..., 20-n according to the newly changed antenna mode.

The case wherein the network operation mode is the infrastructure mode will now be described.

The mode selection unit 15 includes the burst data and the mode selection request information in the second transmission message and transmits the second transmission message to the transmitter 12. The transmitter 12 codes the second transmission message to the other party's terminal through at least one of the plurality of transmitting antennas 20-1, ..., 20-n. In the infrastructure mode, the other party's terminal may be an access point.

The receiver 17 transmits to the information extractor 16 a second response message, which is received from the other party's terminal in response to the second transmission message.

The information extractor 16 extracts information about a current channel between the mobile terminal and the access point. Here, the channel information may include SNR information, LOS/NLOS information indicating whether any obstacle exists in a channel environment between the mobile terminal and the access point, and information for signal strength of the second response message.

The mode selection unit 15 selects a lookup table group corresponding to the infrastructure transmission mode from among the plurality of lookup table groups. The lookup table group corresponding to the infrastructure transmission mode is a lookup table group capable of optimizing energy consumption of the mobile terminal when the mobile terminal transmits signals to the access point.

Thereafter, the mode selection unit 15 selects a modulation method and antenna mode in which minimum energy consumption is obtained from the determined lookup table group using the extracted channel information and QoS information.

Accordingly, the transmission mode switching unit 13 changes an existing modulation method and antenna mode to the selected modulation method and antenna mode. Thereafter, if there is data that is to be transmitted to the access point, the modulation unit 14 codes the data that is to be transmitted according to the selected modulation method and transmits the coded data wirelessly to the other party's terminal through at least one transmitting antenna among the plurality of transmitting antennas 20-1, ..., 20-n.

Then, if the receiver 17 receives a second acknowledge message, which responds to the data transmission from the access point, the receiver 17 determines whether data that is to be transmitted to the access point remains through the mode selection unit 15.

If data that is to be transmitted to the access point remains, the receiver 17 transfers the second acknowledge message to the information extractor 16.

The information extractor 16 extracts information about a current channel between the access point and the mobile terminal using the second acknowledge message. Here, the extracted channel information may include SNR information, LOS/NLOS information indicating whether any obstacle exists in a channel environment between the mobile terminal and the access point, and information for signal strength of the second acknowledge message.

The mode selection unit 15 selects a new modulation method and antenna mode in which minimum energy consumption can be obtained from the lookup table group corresponding to the infrastructure transmission mode using the extracted channel information and QoS information.

Accordingly, the transmission mode switching unit 13 changes the selected modulation method and antenna mode to the newly selected modulation method and antenna mode. Then, the modulation unit 14 codes the data that is to be transmitted according to the newly changed modulation method, and transmits the coded data to the other party's terminal wirelessly through at least one transmitting antenna among the plurality of transmitting antennas 20-1, ..., 20-n, according to the newly changed antenna mode.

As described above, the mobile terminal according to an exemplary embodiment of the present invention selects a modulation method and an antenna mode according to a network operation mode, a channel environment between the mobile terminal and the other party's terminal, QoS information, and the like, and transmits or receives signals to or from the other party's terminal while consuming minimum energy.

Figure 2:
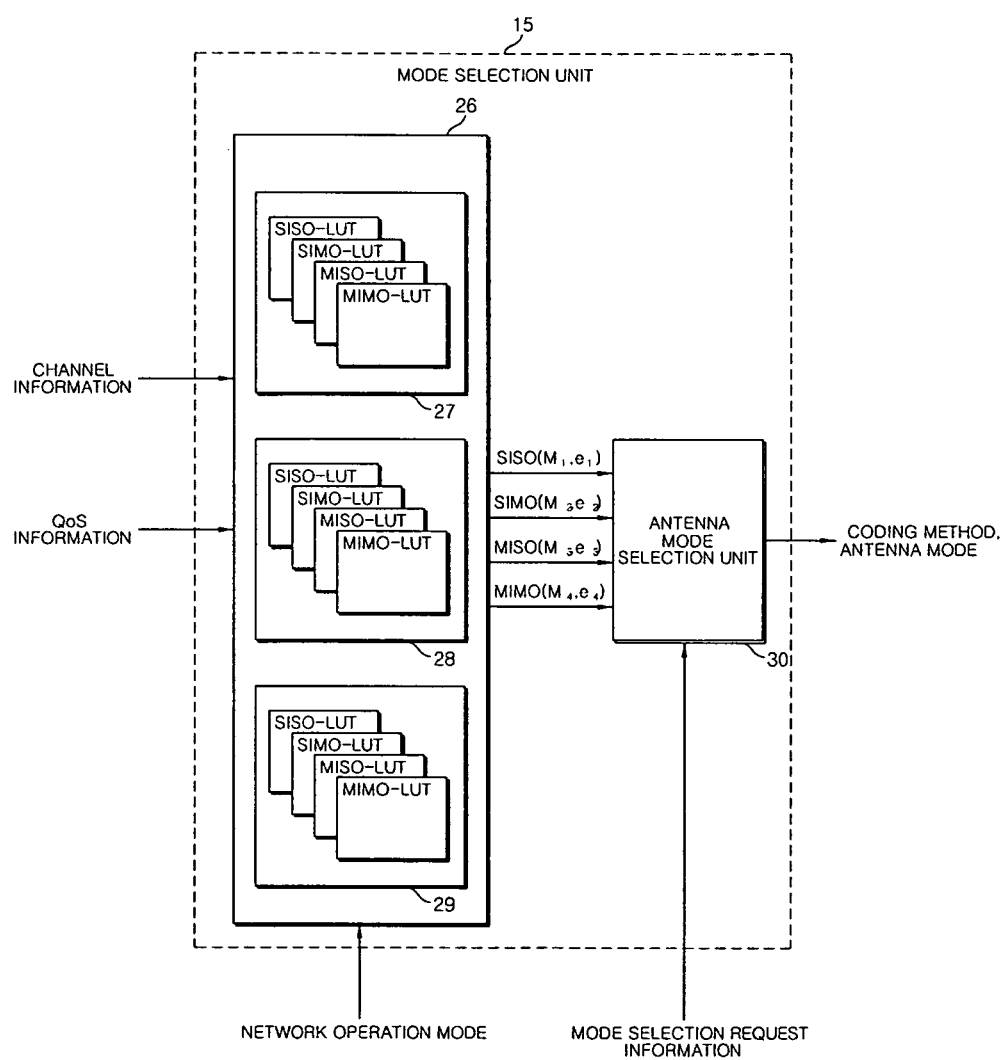
FIG. 2 shows a configuration of a mode selection unit illustrated in FIG. 1, according to an exemplary embodiment of the present invention.

FIG. 2 shows the configuration of the mode selection unit 15 illustrated in FIG. 1, according to an exemplary embodiment of the present invention.

As described in FIG. 2, the mode selection unit 15 includes a modulation method selection unit 26 and an antenna selection unit 30.

The modulation method selection unit 26 includes a plurality of lookup table groups that have been prepared in advance to optimize energy consumption according to a network operation mode of a mobile terminal, and selects a lookup table group corresponding to a network operation mode of the mobile terminal from among the plurality of lookup table groups.

Here, the plurality of lookup table groups may include a first lookup table group 27 for an ad hoc mode for optimizing total energy consumption when the mobile terminal transmits and receives signals, a second lookup table group 28 for an infrastructure transmission mode for optimizing energy consumption when the mobile terminal transmits signals, and a third lookup table group 29 for an infrastructure reception mode for optimizing energy consumption when the mobile terminal receives signals.

Also, each lookup table group may include a plurality of lookup tables that store information about modulation methods, which are suitable for respective antenna modes, and about energy used when each modulation method is used.

The antenna modes may include a SISO mode, a SIMO mode, a MISO mode, and a MIMO mode. In this disclosure, the term "modulation method" contains the meanings of both "modulation" and "channel coding".

That is, the lookup table group may include a lookup table for the SISO mode, a lookup table for the SIMO mode, a lookup table for the MISO mode, and a lookup table for the MIMO mode. A lookup table corresponding to each mode may include information about a modulation method and about energy consumed when the modulation method is used.

Thereafter, the modulation method selection unit 26 extracts information about a modulation method and energy for optimizing energy consumption using channel information and QoS information from lookup tables belonging to the selected lookup table group.

The channel information may be channel information extracted by the information extractor 16 using a message received from the other party's terminal when the mobile terminal is in the ad hoc mode or in the infrastructure transmission mode.

The antenna selection unit 30 selects a modulation method and antenna mode in which a minimum energy value is obtained from the extracted information about the modulation methods and energy as a modulation method and antenna mode in which minimum energy consumption can be achieved between the mobile terminal and the other party's terminal.

Here, mode selection request information is information which is generated when the other party's terminal requests the mobile terminal to select a modulation method and antenna mode for optimizing energy consumption. That is, if mode selection request information is included in a message received from the other party's terminal, the antenna selection unit 30 selects a modulation method and antenna mode in which a minimum energy value is obtained from the extracted information about the modulation methods and energy.

Meanwhile, when the mobile terminal requests the other party's terminal to select a modulation method and antenna mode for optimizing energy consumption, the antenna selection unit 30 selects a modulation method and antenna mode in which a minimum energy value is obtained from the information about the modulation methods and energy extracted by the modulation method selection unit 26, regardless of whether or not mode selection request information is input.

Figure 3:
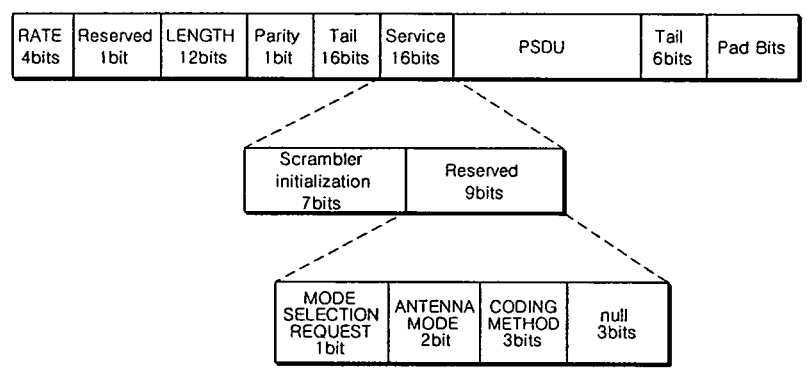
FIG. 3 shows an example of a format of a message which is transmitted/received between the mobile terminal illustrated in FIG. 1 and another party's terminal, according to an exemplary embodiment of the present invention.

FIG. 3 shows an example of a format of a message that is transmitted/received between the mobile terminal illustrated in FIG. 1 and the other party's terminal according to an exemplary embodiment of the present invention.

As illustrated in FIG. 3, the message according to an exemplary embodiment of the present invention can be applied to a message that is transmitted when the mobile terminal requests the other party's terminal to select a modulation method and antenna mode for optimizing energy consumption, and can be applied to a response message of the other party's terminal that responds to the transmitted message.

Here, the message transmitted from the mobile terminal to the other party's terminal may have a format of a Request-To-Send (RTS) packet, and the response message of the other party's terminal may have a format of a Clear-To-Send (CTS) packet.

The message transmitted from the mobile terminal to the other party's terminal may be the first transmission message, the second transmission message, and so forth. The response message of the other party's terminal may be the first response message, the first acknowledge message, the second response message, the second acknowledge message, and so forth, as described above with reference to FIG. 1.

The formats of RTS and CTS packets are defined in the IEEE 802.11a standard.

The message illustrated in FIG. 3 includes a Physical Layer Convergence Protocol (PLCP) header field, a PLCP Service Data Unit (PSDU) field, a tail field, and a pad bits field.

A service field of the PLCP field includes a scrambler initialization field and a reserved field. The scrambler initialization field is a field containing information for initializing a scrambler and the reserved field includes a mode selection request field (1 bit), an antenna mode field (2 bits), a modulation method field (3 bits), and a null field (3 bits).

The mode selection request field includes information indicating whether the mobile terminal requests the other party's terminal to select a modulation method and antenna mode for optimizing energy consumption. If the mode selection request field is set to "1", it is determined that a modulation method and an antenna mode are selected, and if the mode selection request field is set to "0", it is determined that no modulation method and no antenna mode are selected. However, exemplary embodiments of the present invention are not limited to this example.

The antenna mode field includes information about a modulation method for optimizing energy consumption. The modulation method may be Binary Phase Shift Keying (BPSK), Quadrature Phase Shift Keying (QPSK), 16-QAM (Quadrature Amplitude Modulation), 64-QAM, ⅔ Coded modulation, ¾ Coded modulation, ½ Coded modulation, and the like. Accordingly, 3 bits are assigned to the modulation method field.

When two or more antenna modes and modulation methods are selected, 3 bits of the null field can be used.

FIG. 4 shows an example of a lookup table that is used to optimize energy consumption according to an exemplary embodiment of the present invention.

FIG. 4 shows a lookup table when an antenna mode is a SISO mode, wherein the lookup table uses as parameters a channel class, a SNR value, and a data transfer rate (a data rate constraint) $R_r$.

That is, if a channel class, a SNR value, and a data transfer rate are obtained, a modulation method and energy for optimizing energy consumption can be obtained. In the lookup table, a pair (numeral, symbol e) represents a modulation method and energy, respectively. The numerals 2, 4, 16, and 64 represent modulation methods BPSK, QPSK, 16-QAM, and 64-QAM, respectively.

Figure 5:
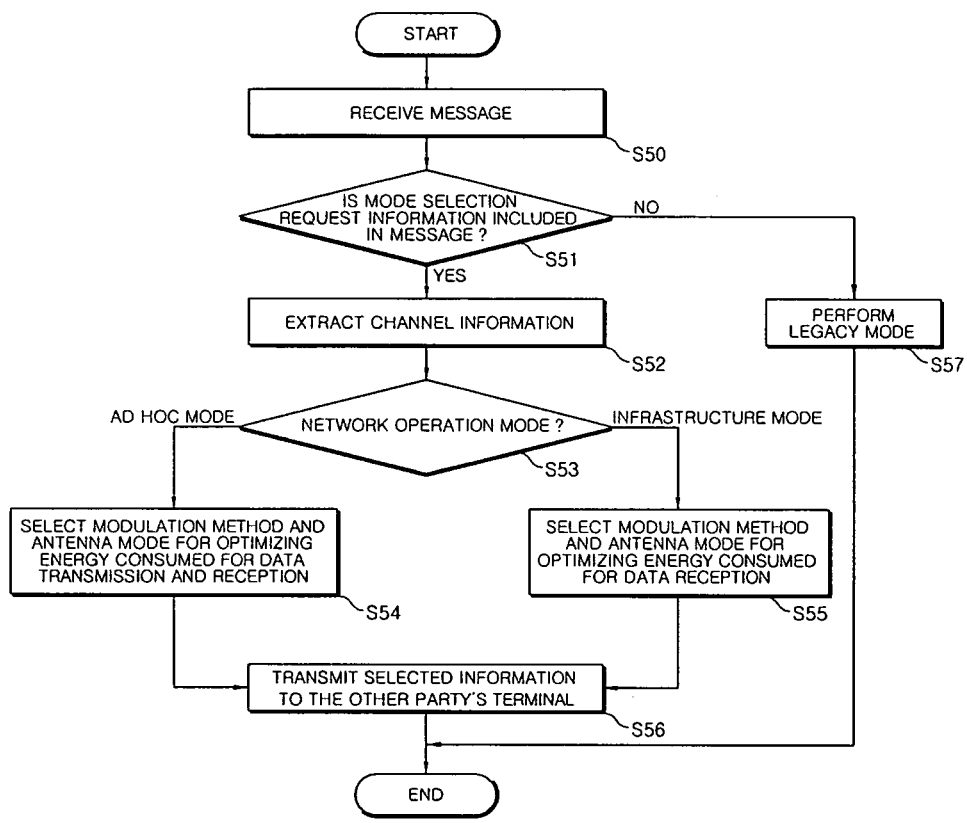
FIG. 5 is a flowchart of a method of receiving and transmitting signals in the mobile terminal illustrated in FIG. 1, according to an exemplary embodiment of the present invention.

FIG. 5 is a flowchart of a method of receiving and transmitting signals in the mobile terminal illustrated in FIG. 1, according to an exemplary embodiment of the present invention.

Referring to FIG. 5, the mobile terminal extracts channel information using a message received wirelessly from the other party's terminal and selects a modulation method and antenna mode for optimizing energy consumption using the extracted channel information and QoS information. The method corresponds to the case where the other party's terminal selects a modulation method and antenna mode for optimizing energy consumption.

The method will be described in detail with reference to FIG. 5, below.

The mobile terminal determines whether mode selection request information is included in a message that is received wirelessly from the other party's terminal (operations S50 and S51).

If mode selection request information is included in the received message, the mobile terminal extracts information about a current channel between the other party's terminal and the mobile terminal using the received message (operation S52). At this point, the channel information may include SNR information, LOS/NLOS information indicating whether any obstacle exists in a channel environment between the mobile terminal and the access point, and information for signal strength of the second acknowledge message.

The mobile terminal checks a current network operation mode (operation S53) and selects a modulation method and antenna mode for optimizing total energy consumed when signals are transmitted and received, if the network operation mode is in the ad hoc mode (operation S54).

The process will now be described in more detail.

The mobile terminal includes a plurality of lookup table groups that have been prepared in advance to optimize energy consumption according to network operation modes, and selects a lookup table group corresponding to the ad hoc mode from among the plurality of lookup table groups.

At this point, the plurality of lookup table groups include a lookup table group corresponding to the ad hoc mode for optimizing a total of energy consumption when the mobile terminal receives and transmits signals, a lookup table group corresponding to the infrastructure transmission mode for optimizing energy consumption when the mobile terminal transmits signals, and a lookup table group corresponding to the infrastructure reception mode for optimizing energy consumption when the mobile terminal receives signals.

Also, each lookup table group may include a plurality of lookup tables that store information about modulation methods, which are suitable for respective antenna modes, and about energy used when each modulation method is used.

The antenna modes may include a SISO mode, a SIMO mode, a MISO mode, and a MIMO mode. In this disclosure, the term "modulation method" contains the meanings of both "modulation" and "channel coding".

Thereafter, the mobile terminal selects a modulation method and antenna mode having minimum energy consumption using the extracted channel information and QoS information from the lookup table group corresponding to the ad hoc mode in response to the mode selection request information.

Then, the mobile terminal transmits the selected modulation method and antenna mode to the other party's terminal (operation S56).

Meanwhile, if the network operation mode is the infrastructure mode, the mobile terminal selects a modulation method and antenna mode for optimizing energy used when the mobile terminal receives signals (operation S55).

The mobile terminal selects the lookup table group corresponding to the infrastructure reception mode from among the plurality of lookup table groups.

Then, the mobile terminal selects a modulation method and antenna mode in which minimum energy consumption can be obtained using the extracted channel information and QoS information from the lookup table group corresponding to the infrastructure receiving mode.

The mobile terminal transmits the selected modulation method and antenna mode to the other party's terminal (operation S56).

Meanwhile, if no mode selection request information is included in the message received in operation S51, the mobile terminal performs a legacy mode for transmitting and receiving signals to and from the other party's terminal (operation S57).

As described above, the method of transmitting and receiving signals in the mobile terminal can select a modulation method and an antenna mode according to a network operation mode, a channel environment between the mobile terminal and the other party's terminal, QoS information, and the like, and can receive and transmit the signals from and to the other party's terminal while consuming minimum energy.

Figure 6:
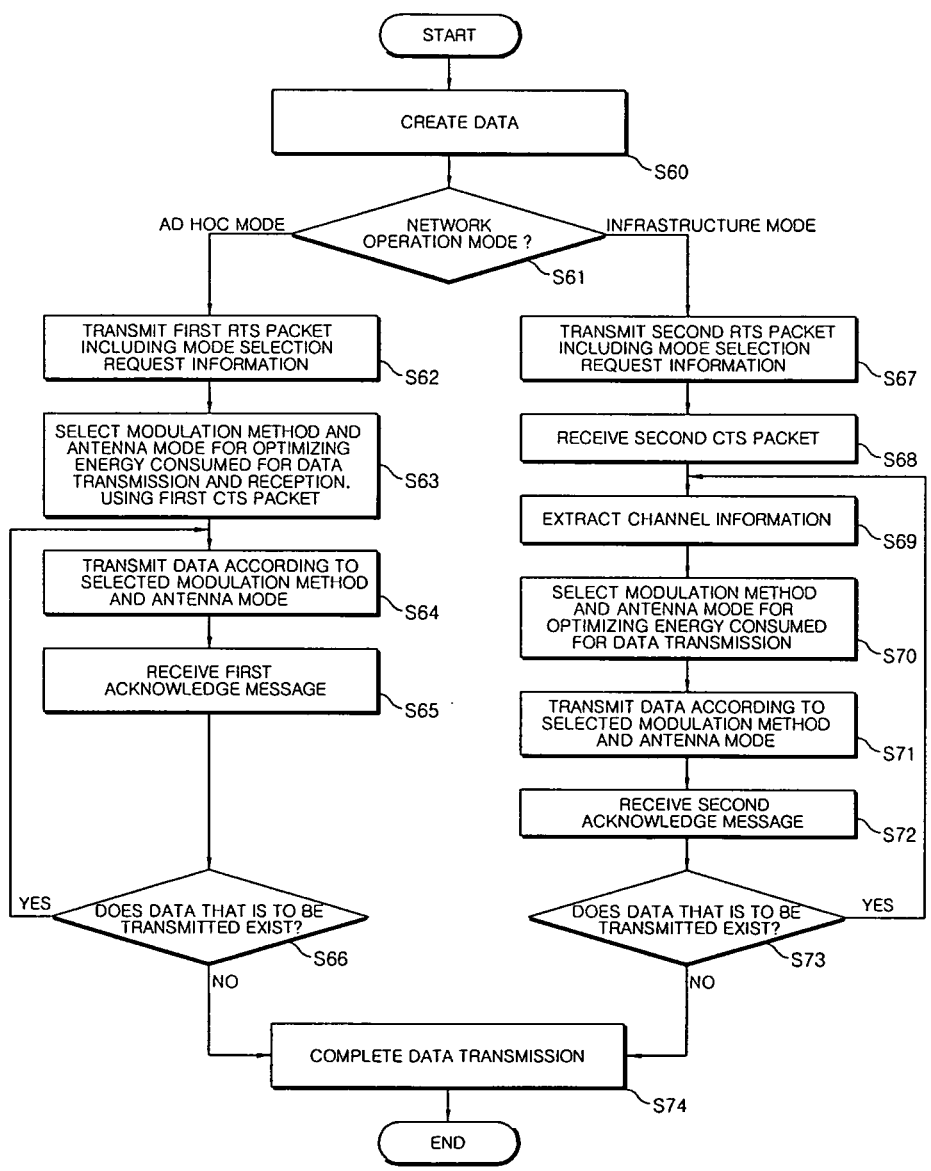
FIG. 6 is a flowchart of a method of receiving and transmitting signals in the mobile terminal illustrated in FIG. 1, according to another exemplary embodiment of the present invention.

FIG. 6 is a flowchart of a method of receiving and transmitting signals in the mobile terminal illustrated in FIG. 1, according to another exemplary embodiment of the present invention.

In FIG. 6, the mobile terminal requests the other party's terminal to select a modulation method and antenna mode for optimizing energy consumption required to transmit and receive signals, and selects the modulation method and antenna mode for optimizing energy consumption using a message which is selected by and received from the other party's terminal.

Then, the mobile terminal codes data using the selected modulation method and transmits the coded data wirelessly to the other party's terminal according to the selected antenna mode.

The process will now be described in detail with reference to FIG. 6.

The mobile terminal creates burst data having a size larger than a predetermined data size (operation S60), and checks its own network operation mode (operation S61).

If the mobile terminal is in the ad hoc mode, the mobile terminal includes the burst data and mode selection request information in a first RTS packet and transmits the first RTS packet to the other party's terminal (operation S62).

Thereafter, the mobile terminal receives a first CTS packet from the other party's terminal in response to the first RTS packet and selects a modulation method and antenna mode for optimizing energy consumption when signals are transmitted and received using information about a modulation method and antenna mode included in the first CTS packet (operation S63).

Then, the mobile terminal codes data according to the selected modulation method and antenna mode and transmits the coded data wirelessly to the other party's terminal through at least one transmitting antenna among a plurality of transmitting antennas (operation S64).

Then, the mobile terminal receives a first acknowledge message of the other party's terminal, which responds to the transmitted data (operation S65), and determines whether data that is to be transmitted to the other party's terminal remains (operation S66).

If data that is to be transmitted to the other party's terminal remains, the process proceeds to operation S64, and the above-described process is repeated. At this point, if a newly selected modulation method and antenna mode are included in the first acknowledge message received from the other party's terminal, the remaining data is coded according to the newly selected modulation method and the coded data is transmitted wirelessly to the other party's terminal through at least one transmission antenna among the plurality of transmitting antennas according to the newly selected antenna mode.

Meanwhile, the case wherein the network operation mode is the infrastructure mode will now be described.

If the mobile terminal is in the infrastructure mode, the mobile terminal adds the burst data and mode selection request information to a second RTS packet and transmits the resultant second RTS packet to the other party's terminal (operation S67). In the infrastructure mode, the other party's terminal may be an access point.

Then, the mobile terminal receives a second CTS packet from the access point in response to the second RTS packet (operation S68) and extracts information about a current channel between the mobile terminal and the access point using the second CTS packet (operation S69). The extracted channel information may include SNR information, LOS/NLOS information indicating whether any obstacle exists in a channel environment between the mobile terminal and the access point, and information for signal strength of the second response message.

The mobile terminal selects a lookup table group corresponding to the infrastructure transmission mode from among the plurality of lookup table groups and selects a modulation method and antenna mode in which minimum energy consumption can be obtained using the extracted channel information and QoS information from the determined lookup table group (operation S70).

At this point, the lookup table group corresponding to the infrastructure transmission mode includes information about a modulation method and energy for optimizing energy consumption of the mobile terminal according to an antenna mode when the mobile terminal transmits signals to the access point.

The mobile terminal codes data that is to be transmitted, and transmits the coded data wirelessly to the access point through at least one transmission antenna among the plurality of transmission antennas (operation S71).

Thereafter, if the mobile terminal receives a second acknowledge message as a response to the data transmission from the access point (operation S72), the mobile terminal determines whether data that is to be transmitted to the access point remains (operation S73).

If data that is to be transmitted to the access point remains, the mobile terminal extracts information about a current channel between the access point and the mobile terminal using the second acknowledge message. Then, the mobile terminal data selects a modulation method and antenna mode for optimizing energy consumption when signals are transmitted according to channel information extracted using the second acknowledge message, and transmits the signals according to the selected modulation method and antenna mode.

Meanwhile, if it is determined in operations S66 and S73 that no data that is to be transmitted remains, the mobile terminal completes the operation of transmitting data (operation S74).

As described above, the method of transmitting and receiving signals in the mobile terminal selects a modulation method and an antenna mode according to a network operation mode, a channel environment between the mobile terminal and the other party's terminal, QoS information, and the like, and receives and transmits signals from and to the other party's terminal while consuming minimum energy.

While certain exemplary embodiments of the invention have been shown and described herein with reference to certain preferred embodiments thereof, it will be understood by those skilled in the art that various changes in form and details may be made without departing from the spirit or scope of the invention as defined by the appended claims and their equivalents.

What is claimed is:

1. A mobile terminal comprising:
   an information extractor configured to extract channel information using a message received from an other party's terminal; and
   a mode selector configured to select a modulation method and an antenna mode for optimizing energy consumption using the channel information and Quality of Service (QoS) information according to a request of the other party's terminal,
   wherein the mode selector comprises
   a first lookup table group corresponding to a first network operation mode for optimizing total energy consumption when signals are transmitted and received,
   a second lookup table group corresponding to a second network operation mode for optimizing energy consumption when signals are received, and
   a third lookup table group corresponding to a third network operation mode for optimizing energy consumption when signals are transmitted.

2. The mobile terminal of claim 1, wherein the mode selector selects a lookup table group for optimizing energy consumption required for communications between the other party's terminal and the mobile terminal, according to a network operation mode of the mobile terminal, from among the first, second, and third lookup table groups that have been prepared in advance to optimize energy consumption according to network operation modes.

3. The mobile terminal of claim 2, wherein the lookup table groups each comprise a plurality of lookup tables that store information about modulation methods in which minimum energy is used and information about values of energy used when the modulation methods are used according to antenna modes.

4. The mobile terminal of claim 2, wherein the mode selector selects a lookup table group corresponding to the network operation mode from among the first, second, and third lookup table groups, and selects a modulation method and an antenna mode in which minimum energy consumption is obtained using the channel information and the QoS information from the selected lookup table group.

5. A mobile terminal comprising:
   a mode selector configured to select a modulation method and an antenna mode according to a request of an other party's terminal for optimizing energy consumption required for communications between the mobile terminal and the other party's terminal using a message which is received wirelessly from the other party's terminal; and
   a transmitter configured to code data according to the modulation method and transmit the coded data wirelessly to the other party's terminal according to the antenna mode,
   wherein the mode selector comprises
   a first lookup table your corresponding to a first network operation mode for optimizing total energy consumption when signals are transmitted and received,
   a second lookup table group corresponding to a second network operation mode for optimizing energy consumption when signals are received, and
   a third lookup table group corresponding to a third network operation mode for optimizing energy consumption when signals are transmitted.

6. The mobile terminal of claim 5, wherein, when the mobile terminal is in a first network operation mode, the mode selector changes an existing modulation method and an existing antenna mode to a modulation method and an antenna mode that are included in the message received from the other party's terminal and optimizes energy consumption when signals are transmitted and received.

7. The mobile terminal of claim 5, wherein, when the mobile terminal is in a second network operation mode, the mode selector selects a modulation method and an antenna mode for optimizing energy consumption using channel information and (Quality of Service) QoS information extracted using the message which is received wirelessly from the other party's terminal.

8. The mobile terminal of claim 7, wherein, when the mobile terminal is in the second network operation mode, the mode selector selects the second lookup table group for optimizing energy consumed when signals are received from among the first, second, and third lookup table groups that have been prepared in advance to optimize energy consumption according to network operation modes.

9. The mobile terminal of claim 8, wherein the lookup table groups each comprise a plurality of lookup tables that store information about modulation methods in which minimum energy is used according to antenna modes and information about values of energy consumed when the modulation methods are used.

10. The mobile terminal of claim 7, wherein the mode selector selects the lookup table group corresponding to the second network operation mode from among the first, second, and third lookup table groups, and selects a modulation method and an antenna mode in which minimum energy consumption is obtained using the channel information and the QoS information from the selected lookup table group.

11. A method of transmitting and receiving a signal in a mobile terminal, the method comprising:
   extracting channel information using a message received wirelessly from an other party's terminal; and
   selecting a modulation method and an antenna mode for optimizing energy consumption using the channel information and Quality of Service (QoS) information according to a request of the other party's terminal,
   wherein the selecting of the modulation method and the antenna mode comprises selecting a looking table group for optimizing energy consumption between the other party's terminal and the mobile terminal according to a network operation mode of the mobile terminal from among a plurality of lookup table groups that have been prepared in advance to optimize energy consumption according to network operation modes, and wherein the plurality of lookup table groups further comprises
   a first lookup group corresponding to a first network operation mode for optimizing a total of energy consumption when signals are transmitted and received,
   a second lookup table group corresponding to a second network operation mode for optimizing energy consumption when signals are received, and
   a third lookup table group corresponding to a third network operation mode for optimizing energy consumption when signals are transmitted.

12. The method of claim 11, wherein the lookup table groups each comprise a plurality of lookup tables that store information about modulation methods in which minimum energy is used, and information about values of energy consumed when the modulation methods are used according to antenna modes.

13. The method of claim 11, wherein the selecting of the modulation method and the antenna mode further comprises:
   selecting a lookup table group corresponding to the network operation mode from among the first, second and third lookup table groups; and
   selecting a modulation method and an antenna mode in which minimum energy consumption is obtained using the channel information and the QoS information from the selected lookup table group.

14. A method of receiving and transmitting a signal in a mobile terminal, the method comprising:
   selecting a modulation method and an antenna mode according to a request of an other party's terminal for optimizing energy consumption required for communications between the mobile terminal and the other party's terminal using a message which is received wirelessly from the other party's terminal; and
   coding data according to the modulation method and transmitting the coded data wirelessly to the other party's terminal according to the antenna mode,
   wherein the selecting of the modulation method and the antenna mode comprises selecting a lookup able optimizing energy consumption between the other party's terminal and the mobile terminal according to a network operation mode of the mobile terminal from among a plurality of lookup table groups that have been prepared in advance to optimize energy consumption according to network operation modes, and wherein the plurality of lookup table groups further comprises
   a first lookup table group corresponding to a first network operation mode for optimizing a total of energy consumption when signals are transmitted and received,
   a second lookup table group corresponding to a second network operation mode for optimizing energy consumption when signals are received, and
   a third lookup group corresponding to a third network operation mode for optimizing energy consumption when signals are transmitted.

15. The method of claim 14, wherein the selecting of the modulation method and the antenna mode comprises changing an existing modulation method and an existing antenna mode to a modulation method and an antenna mode that are included in the message received from the other party's terminal and optimize energy consumption when signals are transmitted and received when the mobile terminal is in a first network operation mode.

16. The method of claim 14, wherein the selecting of the modulation method and the antenna mode comprises selecting a modulation method and an antenna mode for optimizing energy consumption using channel information and Quality of Service (QoS) information extracted from the message received from the other party's terminal when the mobile terminal is in a second network operation mode.

17. The method of claim 16, wherein the selecting of the modulation method and the antenna mode further comprises:
   selecting the second lookup table group corresponding to the second network operation mode from among the first, second, and third lookup table groups that have been prepared in advance to optimize energy consumption according to network operation modes; and
   selecting a modulation method and an antenna mode in which minimum energy consumption is obtained using the channel information and the QoS information from the selected lookup table group.

18. The method of claim 17, wherein the lookup table groups comprise a plurality of lookup tables that store information about modulation methods in which minimum energy is used according to antenna modes and information about values of energy consumed when the modulation methods are used.

* * * * *